United States Patent

Hopwood-Jones

[15] 3,675,755
[45] July 11, 1972

[54] ORIENTING AND FEEDING SMALL DISCS

[72] Inventor: Charles Douglas Hopwood-Jones, Verdun, Quebec, Canada

[73] Assignee: Northern Electric Company Limited, Montreal, Quebec, Canada

[22] Filed: May 4, 1970

[21] Appl. No.: 34,351

[52] U.S. Cl. ..................................................198/33 R
[51] Int. Cl. .......................................................B65g 47/24
[58] Field of Search ................................221/169; 198/33 R

[56] References Cited

UNITED STATES PATENTS

| | | | |
|---|---|---|---|
| 2,585,558 | 2/1952 | Lakso | 198/33 X |
| 2,376,293 | 5/1945 | Vergobbi | 198/33 X |
| 1,750,310 | 3/1930 | Jonket et al. | 198/33 X |

Primary Examiner—Richard E. Aegerter
Assistant Examiner—Douglas D. Watts
Attorney—Westell & Hanley

[57] ABSTRACT

A method and apparatus for orienting and feeding small discs of uniform thickness and diameter, in which a quantity of the discs is fed onto a pair of parallel, helically ridged rollers spaced apart to form a horizontal slot having a width greater than the thickness of one of the discs but substantially less than twice its thickness. The helical ridges on both rollers are convoluted in the same direction. The rollers are rotated in opposite directions with their surfaces moving upwardly adjacent the slot. Passage means are located beneath the slot to receive the discs passing between the rollers and to maintain their orientation.

7 Claims, 5 Drawing Figures

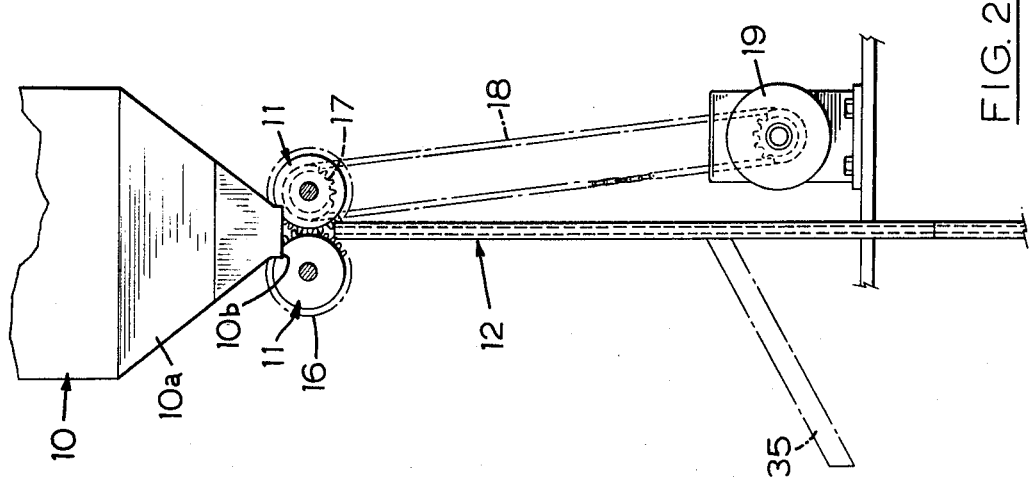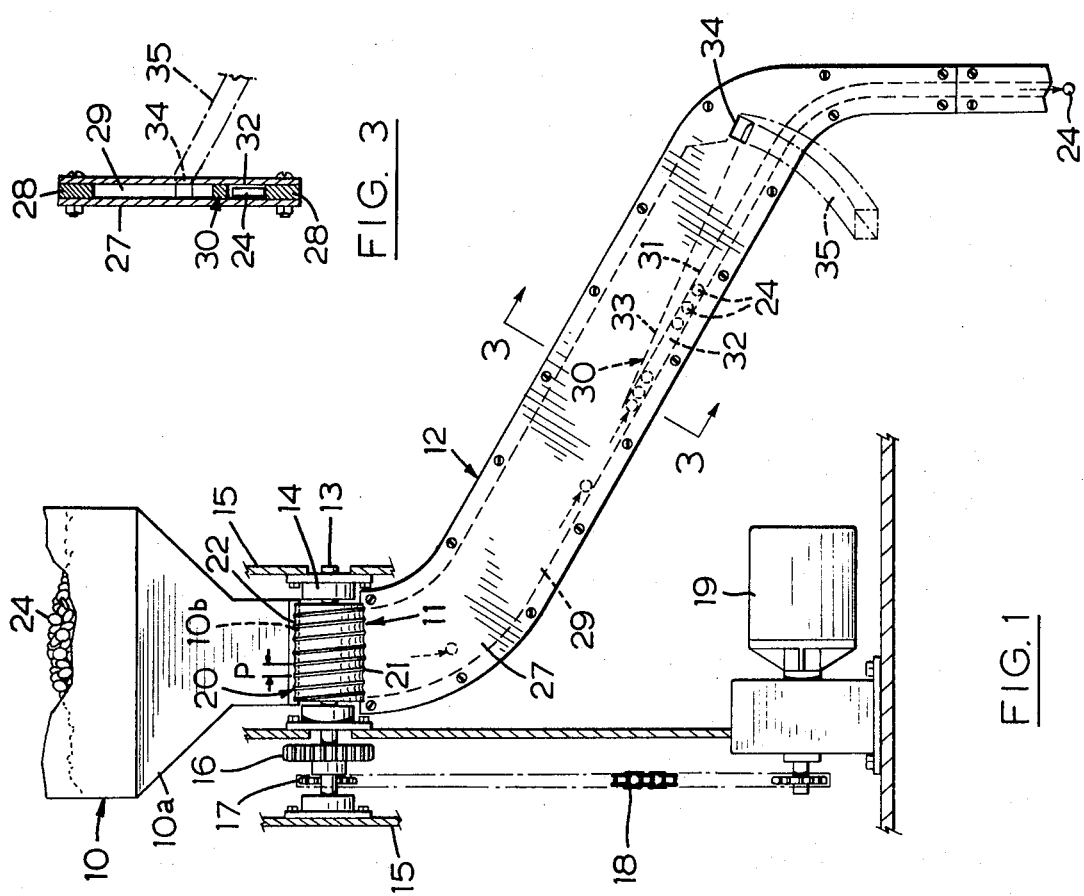

INVENTOR.
CHARLES D. HOPWOOD-JONES
BY Westell & Hanley

ORIENTING AND FEEDING SMALL DISCS

The present invention relates to the orienting and feeding of small discs such as those used as spacers in assembling coaxial cables.

The automatic orienting and feeding of small disc-like objects is often required in automatic machine production. An example is the manufacture of co-axial cables in which polyethylene discs are split and applied by a disc applicator at regular intervals along a conductor. These discs are normally fed from a hopper, where they are heaped in random orientation, to an applicator in a single line and a common plane. Different types of apparatus have been developed to orient and feed the discs from the hopper to the applicator. Such devices are usually oscillatory or vibratory and suffer from the disadvantages that they are slow, operate over a narrow output range, are relatively complex in construction and require considerable maintenance. Another disadvantage in these devices is that the hopper needs to be vibrated in order to prevent the formation of bridges or holes which prevent the free outflow of the discs.

It is an object of the present invention to provide a simplified method and apparatus for orienting small discs.

It is a further object of the invention to provide a method and apparatus for improved output and control in the orienting of small discs.

An example embodiment of the invention is shown in the accompanying drawings in which:

FIG. 1 is a side view in elevation of a disc orienting and feeding device;

FIG. 2 is an end view of the device shown in FIG. 1;

Figure 4:
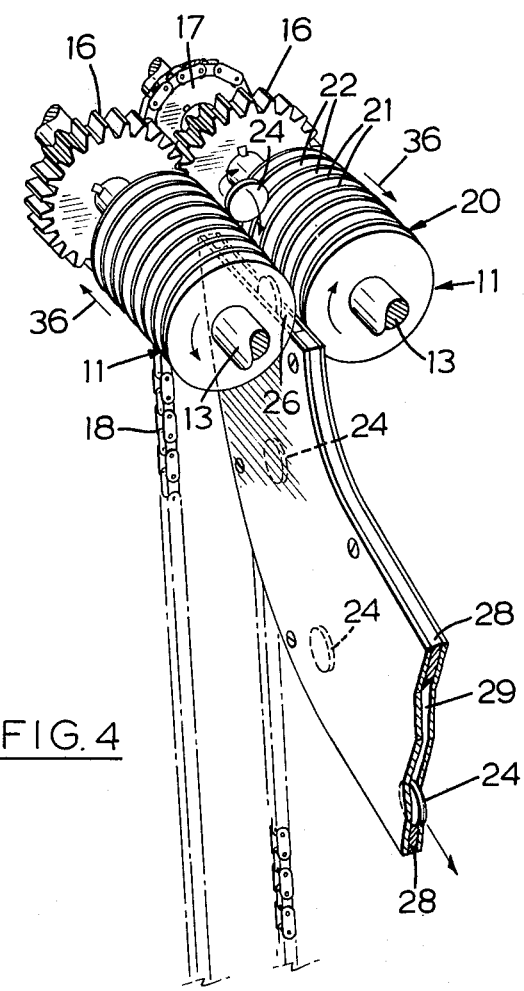
Figure 5:
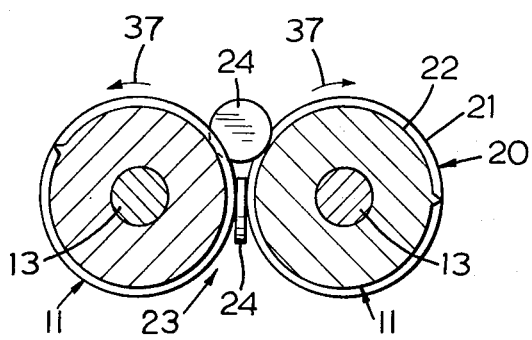

Briefly, 3 is a view in cross-section taken along the line 3—3 of FIG. 1;

FIG. 4 is a perspective view of the apparatus as shown in FIG. 1, in the zone of the rollers; and FIG. 5 is a cross-sectional end view of the rollers shown in FIG. 4.

The apparatus shown in the drawings comprises a hopper 10, a pair of rollers 11 located below the hopper at its outlet end, and a chute 12 leading downwardly from the rollers towards an applicator machine.

Rollers 11 are fixed on a pair of horizontal, parallel shafts 13 freely journaled in bearing housings 14 which are mounted on a supporting frame 15. A pair of intermeshing gears 16 are keyed on shafts 13, one on each shaft. A sprocket 17 is also keyed on one of the shafts 13 and is engaged by a chain 18 driven by a motor 19.

Each roller 11 carries a helical ridge 20 on its cylindrical surface. Ridges 20 are convoluted in the same direction on rollers 11. The helix of ridge 20 has a narrow pitch P, crown 21 of the ridge is flat, and groove 22 between successive convolutions of the ridge is shallow. Rollers 11 are spaced apart to provide a narrow slot 23 running between them. The width of slot 23, i.e., the distance between the crowns 21 of ridges 20 of the two rollers, is wider than the thickness of a disc 24 to be oriented but narrower than twice its thickness, the width of the slot being preferably between 1.25 and 1.4 times the thickness of the disc.

Rollers 11, located at the outlet end of hopper 10, are bounded by the side walls 10a of the hopper and form the bottom of the hopper within the boundary of the bottom ends 10b of the side walls.

The upper, inlet opening 26 of chute 12 is located between rollers 11 directly below slot 23. Chute 12 comprises a pair of plates 27 separated by spacers 28 to define a passage 29, leading downwardly from inlet end 26, of approximately the same width as slot 23. A knife separator 30 is located in passage 29, with the lower edge 31 of the separator defining a more restricted passage 32 slightly larger than the diameter of discs 24. The upper edge 33 of knife separator 30 leads to an outlet 34 in chute 12, which is connected by a suitable conduit 35 to a collecting bin (not shown).

In the operation of the example embodiment, motor 19 drives rollers 11 through chain 18 through chain 18 which engages sprocket 17. Intermeshing gears 16 cause rollers 11 to rotate in opposite directions, as indicated by arrows 37 in FIG. 5 of the drawings, and this rotation causes helical ridges 20 on rollers 11 to travel in opposite directions, as indicated by arrows 36 in FIG. 4. With hopper 10 at least partially filled with uniform discs 24 for channelling towards rollers 11, the rotation of the rollers 11 will agitate the discs above the rollers and cause those discs in the region between the rollers to drop towards slot 23. Those discs 24 which are oriented in a plane parallel to shafts 13 and normal to the plane passing through the shafts, will drop through slot 23 into chute 12 through its inlet opening 26 which is positioned between rollers 11 and aligned with slot 23. Those discs 24 which are not in the aforementioned plane of slot 23 will be tumbled by the rotation of rollers 11, while those taking a position transverse to the slot, such as shown in FIGS. 4 and 5 of the drawings, will be rotated about a transverse axis into the plane of the slot by the action of ridges 20. In other words, the opposing directions of travel of ridges 20 on rollers 11 will impart a twist to disc 24 and insure that the disc is moved out of a plane which would otherwise cause it to block its own passage, and the passage of other discs, through slot 23.

As disc 24 enters passage 29 in chute 12 it rolls along bottom spacer 28 into passage 31 to form a single line with companion discs, all oriented in the same plane. If there is an accumulation of discs 24 in front of passage 31, knife separator 30 will divert the excess discs which will pass out through opening 34 and along conduit 35 to be collected in a bin and redeposited in hopper 10.

It will be appreciated that the output of discs 24 from this orienting and feeding device will vary in accordance with the length of rollers 11, and also in accordance with the speed of rotation of the rollers. While the length of the rollers is fixed, their speed may be governed by motor 19 to provide a wide range of control.

Of course the configuration of helical ridge 20 on each roller 11 may be varied as long as the ridges perform their required function. For example a flat crown 21 on ridge 20 formed by cutting a shallow, convex groove 22 in the surface of each roller 11, may be selected. A preferable width of groove 22 is in the range $0.5t$ to $1.5t$ where $t$ is the thickness of discs 24 being oriented by the device, and a preferable pitch P is in the range $0.5D$ to $1.5D$ where D is the diameter of the discs. The depth of groove 22 should not approach $\frac{1}{2}(D-g)$ where $g$ is the width of slot 23 between the crowns 21 of ridges 20.

In an example construction of the device according to the invention, small polyethylene discs of 0.375-inch diameter and 0.085-inch thickness were oriented and fed at a rate of 2,000 discs per minute, which is a rate considerably higher than that provided in commercial devices now available. This output was achieved at a roller speed of 150 revolutions per minute, which indicates the wide range of control available for a readily adjustable feed rate.

I claim:

1. Apparatus for orienting discs of a uniform thickness and diameter for passage through a feeding device, comprising:
   a pair of parallel rollers each journaled for rotation about its longitudinal axis;
   a helical ridge located on the cylindrical surface of each roller, both ridges being axially convoluted in the same direction between the ends of each roller, the rollers being spaced apart to form a horizontal slot therebetween having a width between the ridges of the two rollers greater than the thickness of one of said discs but substantially less than twice said thickness;
   means positioned above the rollers to channel a quantity of the discs downwardly into the zone above the rollers;
   passage means having an inlet opening located below the slot and adapted to receive those discs passing through the slot and to maintain their orientation; and
   means to drive the roller in opposite directions one to another whereby the surfaces of the ridges adjacent the slot move upwardly and the ridges travel helically along the rollers in opposite directions so as to twist discs which are oriented transversely to said horizontal slot into alignment therewith.

2. Apparatus as claimed in claim 1 in which the feeding means comprises a hopper and the rollers form the bottom of the hopper.

3. Apparatus as claimed in claim 1 in which each roller is fixed on an axial shaft, the drive means comprising intermeshed gears fixed one to each shaft and means on one of the shafts for connection with a drive motor.

4. Apparatus as claimed in claim 1 in which the passage means comprises a chute having an upper end opening adjacent the slot and having a passage of a width substantially the thickness of a disc, and means within the passage to form those discs passing through the chute into a single line.

5. Apparatus as claimed in claim 1 in which the helical ridge on each roller has a flat crown and a shallow groove between successive convolutions.

6. Apparatus as claimed in claim 1 in which the width of the slot is between 1.25 and 1.4 times the thickness of a disc.

7. Apparatus as claimed in claim 1 including means to vary the speed of rotation of the rollers whereby the rate of output of oriented discs is controlled.

* * * * *